Figure 1:
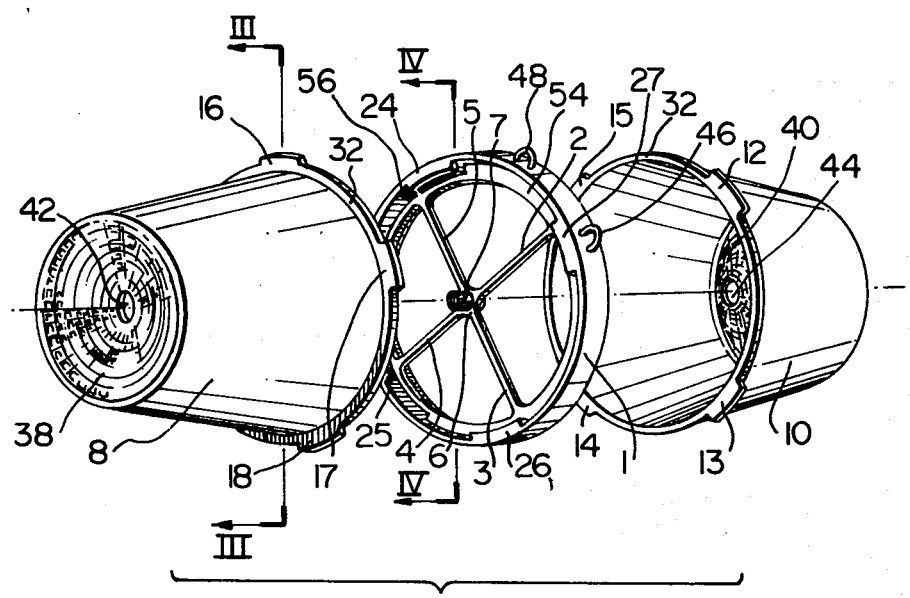

United States Patent [19]

Steck et al.

[11] 4,452,006
[45] Jun. 5, 1984

[54] INSECT TRAP

[75] Inventors: Warren F. Steck; Edward W. Underhill; Melvin D. Chisholm; Berton K. Bailey, all of Saskatoon, Canada

[73] Assignee: National Research Council of Canada, Ottawa, Canada

[21] Appl. No.: 430,834

[22] Filed: Sep. 30, 1982

[30] Foreign Application Priority Data

Dec. 14, 1981 [CA] Canada .................................. 393181

[51] Int. Cl.³ .............................................. A01M 1/02
[52] U.S. Cl. ......................................... 43/122; 43/107
[58] Field of Search .................. 43/122, 107, 100–105, 43/65, 66

[56] References Cited

U.S. PATENT DOCUMENTS

| 846,556 | 3/1907 | Dollar | 43/100 |
|---|---|---|---|
| 1,011,304 | 12/1911 | Andrews | 43/65 |
| 1,787,421 | 12/1930 | Ruddell | 43/107 |
| 1,900,199 | 3/1933 | Pickett | 43/107 |
| 2,736,986 | 3/1956 | Goldstein | 43/103 |
| 3,271,894 | 9/1966 | Manno et al. | 43/100 |
| 3,855,727 | 12/1974 | Canoy | 43/122 |
| 3,916,558 | 11/1975 | Crouch | 43/100 |
| 4,221,070 | 9/1980 | Swindell | 43/100 |

Primary Examiner—Nicholas P. Godici
Assistant Examiner—Kurt Rowan
Attorney, Agent, or Firm—Francis W. Lemon

[57] ABSTRACT

A cone-orifice insect trap comprising an intermediate annular member carrying a lure and two truncated-cone-shaped casing members with perforated, funnel-shaped, insect trapping end walls extending inwardly from each end of the casing members. The modular construction ensures ease of assembly while the casing members may be nested together to avoid occupying an unduly large volume during, for example, transport. Close manufacturing tolerances for the insect trap entrances and positioning the lure reduce trap-to-trap performance variability. The trap has a long field life and a wide variety of uses.

2 Claims, 6 Drawing Figures

INSECT TRAP

This invention relates to insect traps.

So-called cone-orifice traps have been found to be more suitable than what is known as sticky traps for the capture of flying insects such as, for example, certain moth species, see "Pheromone Traps for Moths: Evaluation of Cone Trap Designs and Design Parameters" Warren Steck and B. K. Bailey, Environmental Entomology, Entomological Society of America, pages 449-455. The reasons why sticky traps were found to be less suitable were that airborne dust was found to destroy the sticking properties of the adhesive and these traps required frequent line-changes once the sticky surfaces became filled with captured insects.

While cone-orifice traps have been found to be useful there is a need for cone-orifice traps which:

(i) Are in a modular form which ensures ease of assembley.

(ii) Have separable nesting, hollow, truncated-cone-shaped casing members so that bulk transport is possible without occupying an unduly large volume.

(iii) Close manufacturing tolerances for the insect trapping entrances and positioning of the lure are possible thus reducing trap-to trap performance variability and ensuring the accurate and reproducible sampling of insect populations that is necessary for the prediction of future outbreaks and assessment of the need for control measures.

(iv) A trap which has a long field life which will permit the use of the trap in large-scale agriculture and forestry as well as in small-scale agriculture, orchards and urban areas.

According to the present invention there is provided an insect trap, comprising:

(a) an intermediate, annular member, (b) means for securing an insect luring, odour emitting substance in a substantially central position in the annular member, (c) two hollow, truncated-cone-shaped casing members which are capable of being nested together, (d) means for securing inner, annular ends of the casing members to each side of the annular member, with at least one of the casing members being secured in a removable manner, (e) two perforated, funnel-shaped, insect trapping end wall members each having an inner open end forming an insect trapping entrance and an outer annular end attached to an outer, annular end of one of the casing members to extend inwardly therein towards the central, insect entrance, and (f) means for suspending the trap, when assembled, with the two casing members extending in generally horizontal directions away from the annular member.

In some embodiments of the present invention the two hollow, truncated-cone-shaped casing members taper inwardly from the inner, annular ends, and the perforated, funnel-shaped, insect wall members are formed integrally with the casing members.

The means for securing the inner annular ends of the casing members to each side of the annular member comprises arcuate flanges spaced around the inner ends of the casing members and arcuate flange receiving members circumferentially spaced around the intermediate, annular member.

An inner, annular web is attached to the intermediate, annular member and end webs secured on the arcuate flange receiving members, the flange receiving members are then spaced from the inner, annular web to receive, by relative rotational movement, the arcuate flanges therebetween as a press-fit until the arcuate flanges abut against the end webs.

The end webs are preferably positioned so that the arcuate flanges of each of the casing members are rotated in opposite directions during assembly.

Figure 2:
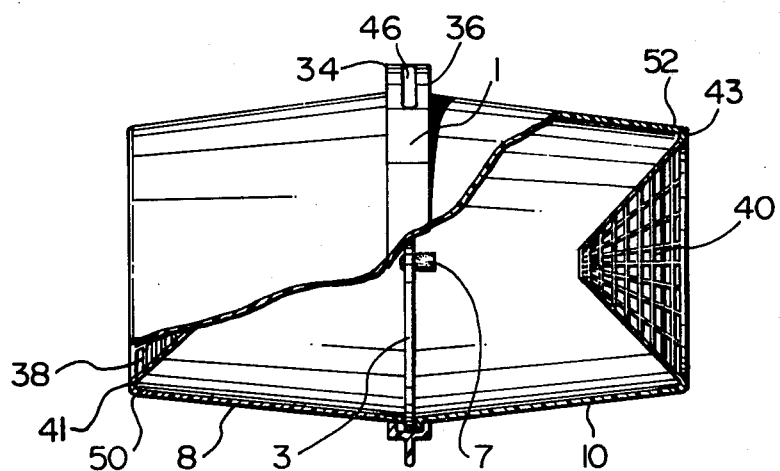
Figure 3:
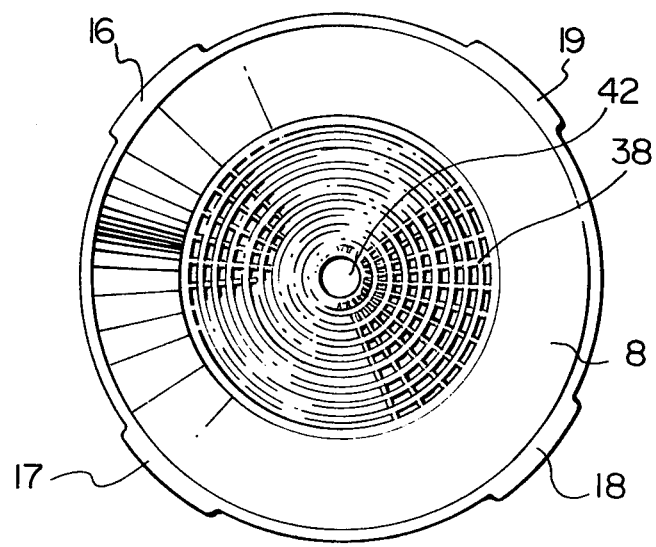
Figure 4:
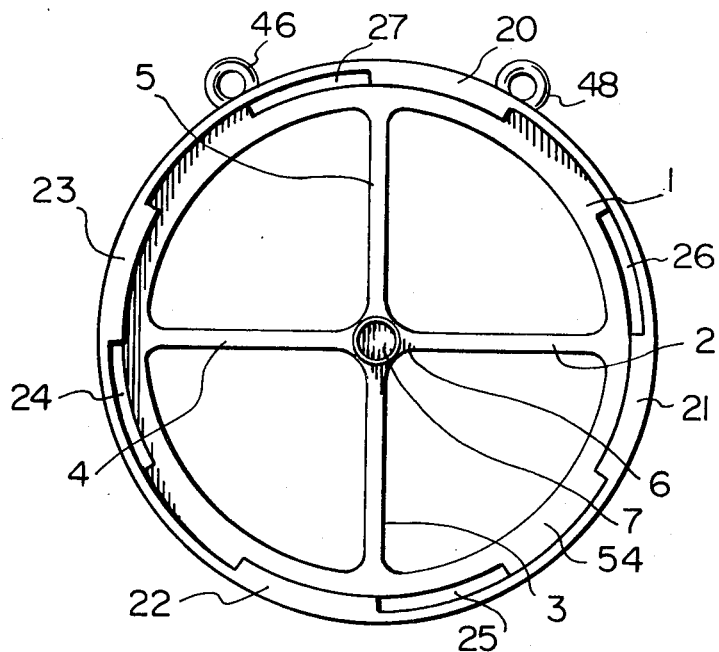
Figure 5:
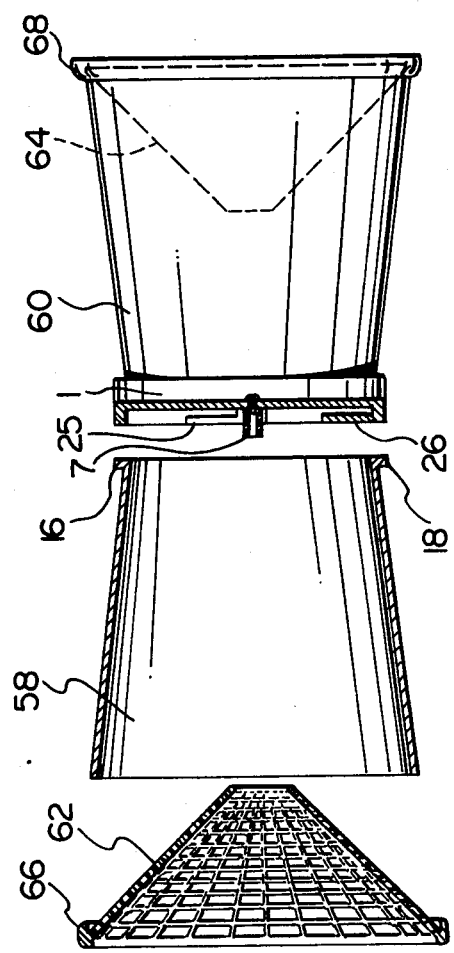

In the accompanying drawings which illustrate, by way of example, an embodiment of the present invention, FIG. 1 is an exploded, corner view of an insect trap, FIG. 2 is a side view of the insect trap shown in Figure with the parts assembled, FIG. 3 is an end view along III—III, FIG. 1 of a hollow, truncated-cone-shaped casing, together with a perforated, funnel-shaped, insect traping end wall, shown in FIG. 1, FIG. 4 is a similar view to FIG. 3 but along IV—IV, FIG. 1 and of an intermediate, annular member shown in FIG. 1, FIG. 5 is a partly sectional, partly exploded side view of a different insect trap to that shown in FIGS. 1 to 4, and FIG. 6 is an end view of an end wall member of the trap shown in FIG. 5.

Referring now to FIGS. 1 to 4 there is shown an insect trap, comprising:

(a) an intermediate, annular member 1, (b) means in the form of radial arms 2 to 5, a central web 6 and a bait member 7 securing an insect luring, odour emitting substance in a substantially central position in the annular member 1, (c) two hollow, truncated-cone-shaped casing members 8 amd 10 which are capable of being nested together, (d) means, in the form of arcuate flanges 12 to 19 and corresponding arcuate flange receiving members 20 to 27, for securing inner, annular ends 30 and 32 of the casing members, 8 and 10 respectively, to each side 34 and 36 respectively, of the annular member 1, with at least one of the casing members 8 and 10 being secured in a removable manner, (e) two, perforated, funnel-shaped, insect trapping end wall members 38 and 40 each having an inner open end forming an insect trapping entrance and an outer annular end 41 and 43 respectively, attached to an outer, annular end, 50 and 52 respectively, of one of the casing members 8 and 10 to extend inwardly therein towards the insect trapping entrance 42 and 44, and (f) means, in the form of eyelets 46 and 48, for suspending the trap, when assembled, with the two casing members 8 and 10 extending in generally horizontal directions away from the annular member 1.

The bait member 7 may be of cup-shaped and, for example, of rubber or polyvinyl chloride. The bait member 7 may be given a drop of an insect pheromone, which permeates the rubber or polyvingly chloride, and then the bait member 7 pressed into a hole in the central web 6. In this embodiment the radial arms 2 to 5 and the central web 6 are moulded integrally with the annular member 1 together with the eyelets 46 and 48.

The arcuate flanges 12 to 19 are circumferentially spaced around the inner annular ends 30 and 32 of the casing members 8 and 10. The arcuate flange receiving members 20 to 27 are circumferentially spaced around each side of an inner annular web 54, and are also moulded integrally with the annular member 1 together with the annular web 54. The arcuate flange receiving members 20 to 27 are spaced from the annular web 54, to receive, by relative rotational movement, one of the arcuate flanges 12 to 19 therebetween as a press-fit until they abut against end webs, such as 56 (FIG. 1) on the arcuate flange receiving members 12 to 19. It should be noted from FIG. 1 that, for ease of assembly, the end webs are positioned so that flanges 16 to 19 of casing member 8 are rotated anticlockwise beneath the arcuate flange receiving members 24 to 27 respectively while the arcuate flanges 12 to 15 of casing member 10 are rotated in the opposite direction beneath the arcuate flange receiving members 20 to 23 respectively.

In this embodiment the two, perforated, funnel-shaped, insect trapping end wall members 38 and 40 are formed integrally with the casing members 8 and 10 respectively, and are perforated by being formed as open lattice structures.

The parts of the insect trap shown in FIGS. 1 to 4, other than the bait member 7, may be moulded from, for example, polypropylene.

In operation of the insect trap shown in FIGS. 1 to 4 is stored, packaged and transported with the casing members nested together.

For use, all that is necessary is for the bait member to be dosed with the appropriate insect attractant and inserted in the hole in the central web 6. The casing members 8 and 10 are then assembled with the intermediate, annular member 1, as shown in FIG. 2, and the insect trap is suspended by means of the eyelets 46 and 48 from, for example, a tree.

Figure 6:
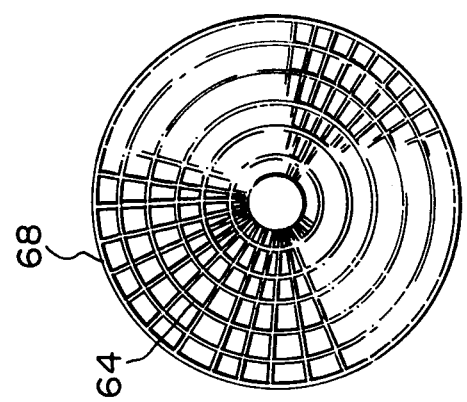

In FIGS. 5 and 6, similar parts to those shown in FIGS. 1 to 4 are designated by the same reference numerals and the previous description is relied upon to describe them.

In FIG. 5 the left-hand half of the insect trap is exploded and is a sectional side view about the vertical centerline, while the right-hand side is an assembled side view.

In FIGS. 5 and 6, the two, hollow truncated-cone-shaped casing members 58 and 60 taper outwardly away for the intermediate, annular member 1 and the two, perforated funnel-shaped, insect trappping end wall members 62 and 64 are removably secured to their respective casing members 58 and 60 by collars 66 and 68.

The insect trap is assembled as shown in the right hand portion of FIG. 5 so that the insect trap has a general outline resembling that of a diabolo spool. In this embodiment, the funnel-shaped insect trapping end wall members 62 and 64 are clipped over the outer ends of the casing members 58 and 60 by the collars 66 and 68.

The insect trap, shown in FIGS. 5 and 6, functions in a similar manner to the insect trap shown in FIGS. 1 to 4 but has been found better aerodynamically in that it produces a better, centered, plume of attractant leading to a more efficient capture of insects.

We claim:

1. An insect trap comprising:
   (a) an intermediate, annular member,
   (b) means for securing an insect luring, odour emitting substance in a substantially central position in the annular member,
   (c) two hollow, truncated-cone-shaped casing members which are capable of being nested together,
   (d) means for securing inner, annular ends of the casing members to each side of the annular member, with at least one of the casting member being secured in a removable manner, the means for securing the inner, annular ends of the casing members to each side of the annular member comprises arcuate flanges spaced around the inner ends of the casing members, arcuate flanges receiving members circumferentially spaced around the intermediate, annular member, and an inner, annular web attached to the intermediate, annular member and end webs on the arcuate flange receiving members, the flange receiving members being spaced from the inner, annular web to receive, by relative rotational movement, the arcuate flanges therebetween as a press-fit until the arcuate flanges abut against the end webs.

2. An insect trap according to claim 1, wherein the end webs are positioned so that the arcuate flanges of each of the casing members are rotated in opposite directions during assembly.

* * * * *